United States Patent [19]

Kelchner

[11] 4,032,107

[45] June 28, 1977

[54] PLUG VALVE

[75] Inventor: Jay Robert Kelchner, Montour Falls, N.Y.

[73] Assignee: The Hilliard Corporation, Elmira, N.Y.

[22] Filed: Apr. 29, 1976

[21] Appl. No.: 681,547

[52] U.S. Cl. .............................. 251/296; 251/188; 251/161; 251/164; 251/312; 137/625.23; 251/288

[51] Int. Cl.² ........................................ F16K 31/00

[58] Field of Search ................ 137/625.21, 625.23, 137/625.29, 330; 251/296, 161, 164, 188, 312, 288, 289, 290, 292, 309, 315, 308

[56] References Cited

UNITED STATES PATENTS

| 632,934 | 9/1899 | Ashley | 251/161 |
|---|---|---|---|
| 661,712 | 11/1900 | Cederstrom | 251/164 |
| 862,143 | 8/1907 | Duffy | 251/164 |
| 2,504,297 | 4/1950 | Bordo | 251/161 |
| 2,621,012 | 12/1952 | Graham | 251/292 |
| 2,792,196 | 5/1957 | Clade | 251/315 |
| 2,876,985 | 3/1959 | Birchall, Jr. et al. | 251/292 |
| 2,883,146 | 4/1959 | Knox | 251/315 |
| 2,900,995 | 8/1959 | Dickerson et al. | 251/288 |
| 3,521,673 | 7/1970 | Gruner et al. | 137/625.29 |
| 3,948,284 | 4/1976 | Walworth | 251/161 |

FOREIGN PATENTS OR APPLICATIONS 490,789   6/1936   United Kingdom ............... 251/161

Primary Examiner—William R. Cline
Assistant Examiner—H. Jay Spiegel
Attorney, Agent, or Firm—Thomas McNaughton

[57] ABSTRACT

An improved plug valve has means for operating a stem and plug assembly therein, including a sleeve secured within an opening in a valve cover plate, and a tubular gland which is threadably engaged in the sleeve and which coacts with upper and lower stop means incorporated into the stem to raise and lower the plug. Annular sealing rings are employed between the valve stem and the gland and between the gland and the sleeve to prevent leakage, especially when the plug is in a raised position. The upper end of the gland is shaped to receive means for turning the gland to thereby raise or lower the valve stem and plug assembly. A lock nut is rotatable about the gland and selectively against the upper end of the sleeve, whereby the gland may be tightly secured in the sleeve to thereby hold the plug in a sealing position within the valve bore.

8 Claims, 4 Drawing Figures

PLUG VALVE

BACKGROUND OF THE INVENTION

This invention relates to a plug valve of a type useful in diverting or transferring flow of liquid through one piping circuit to another circuit without stopping the flow. More particularly, it pertains to a plug valve of such type which has an improved means for operating the plug thereof and for sealing the operating means against leakage.

A transfer or diverter valve is a type of plug valve used to switch the flow of liquid through one piping circuit to another piping circuit without interrupting or stopping the flow from the exit port of the valve, such as from one filtration or heat exchange system to another such system. For example, transfer valves are employed with duplex filtration systems for filtering lubricating oil supplied to compressors. When maintenance is to be performed on a filtration system which is in operation, the transfer valve is used to switch the flow from a circuit through the system in operation to a circuit through a standby system.

In known transfer valves which are now in general use, the operating joint between the valve operating shank or stem and the valve cover is most commonly sealed by an annular body or ring of fibrous or similar packing material, with the packing material being pressed against the stem by means of an adjustable gland. Typically, the packing ring is enlodged in an enlarged bore portion of a vertical opening formed in the valve cover; and the packing is forced downwardly into such bore and radially inwardly against the stem extending therethrough by turning a plurality of nuts extending through the gland and into the cover. The use of this type of packing ring around the stem increases the resistance to turning of the valve and requires adjustment to prevent leakage.

Diverter or transfer valves may also be equipped with means for lifting or jacking the valve plug from the valve bore and for lowering the plug back into place and securing the plug in the lowered position. One known embodiment of a jacking means comprises an oblong locking plate having a central opening therein to receive an upper end portion of the valve stem, and two bolt means which are threadably engaged in the valve cover for lifting and lowering the locking plate. This jacking assembly is separate from the aforementioned gland and packing assembly and is mounted coaxially with and above the gland assembly. To lift or jack the valve plug, the bolt means are turned to raise the locking plate against a handle which is connected to the upper end of the stem; and, thus, the valve plug is jacked from the valve bore as the locking plate bears upwardly against the handle. After the plug is jacked, the user turns the handle to change the flow of liquid through the valve from one piping circuit to the other. To lower and lock the plug into place, the bolt means are turned into the valve cover until the locking plate bears against an enlarged portion of the stem and thereafter for a prescribed number of turns to force the valve plug into the valve bore.

Another known construction of a diverter valve employs a similar jacking concept. However, instead of using bolts to lift a plate against the handle, a ring member is rigidly secured to the casing cover plate about the valve stem and above a packing gland of the aforementioned type, and a jacking nut is threadably engaged in a bore of the ring member and snugly about the stem. To lift or lower the plug, the jacking nut is rotated within the ring either upwardly against the handle or downwardly against an enlarged portion of the stem.

It will thus be appreciated that the construction of the conventional diverter valves is relatively complex, insofar as the valve operating or jacking assembly is separate from the gland and packing assembly. Also, in the conventional valves which employ a gland and packing assembly as described above, adjustment of the gland is required to assure that leakage about the stem is prevented.

It is an object of the present invention to eliminate such problems and to provide a plug valve having a jacking means wherein a gland is used to simultaneously serve as a jacking nut.

A further object of the present invention is to provide a plug valve having locknut means for preventing the valve plug from moving under the influence of high pressure and vibrations.

Still another object is the provision of a plug valve with foolproof means for preventing improper assembly of the valve.

The present invention also contemplates a plug valve providing fail-safe prevention of leakage through the valve plug jacking means when the valve plug is in an elevated or jacked position.

SUMMARY OF THE INVENTION

The improved plug valve of the present invention includes a valve casing having a bore therein and several ports communicating with the bore; plug means rotatable within the bore for controlling the flow of liquid through the casing ports; a valve operating stem coaxially extending from an upper end of the plug; a cover plate secured to the casing and having an opening through which the stem extends; a sleeve member affixed within the plate opening; a tubular gland member rotatable within the sleeve, with the gland and stem cooperating to lift or lower the plug from or into the bore; resilient ring means for establishing sliding fluid-tight seals between the gland and stem and between the gland and sleeve; locknut means for selectively securing the gland within the sleeve; and handle means for turning the stem and plug assembly.

Preferably, the stem has an enlarged lower end portion forming a first stopping means which coacts with the lower end of the gland to force the plug into the bore. A second stopping means is provided at an elevation above the upper end of the gland preferably by an annular snap ring removably received within a groove formed in the stem. As the gland is turned upwardly, the upper end of the gland lifts the stem and thus the plug from the valve bore.

In a preferred embodiment of the present invention, the handle and plug are connected to the stem by pins which are asymmetrically positioned in such parts. By means of these connecting pins, the stem, handle and plug may only be assembled such that stop extensions formed on the handle will have a predetermined relationship to the plug. The cover plate and casing also include means for guiding their proper assembly. A stop pin secured in the cover plate cooperates with the stop extensions of the handle in the usual manner to assure that the plug and casing ports are properly registered for the desired flow of liquid through the valve.

DESCRIPTION OF A PREFERRED EMBODIMENT

Figure 1:
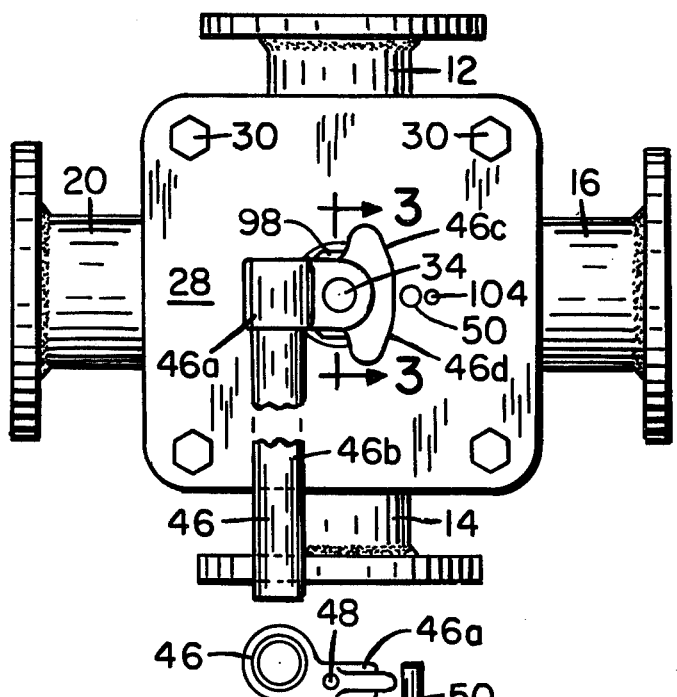
FIG. 1 is a top plan view of the improved plug valve of the present invention.
Figure 2:
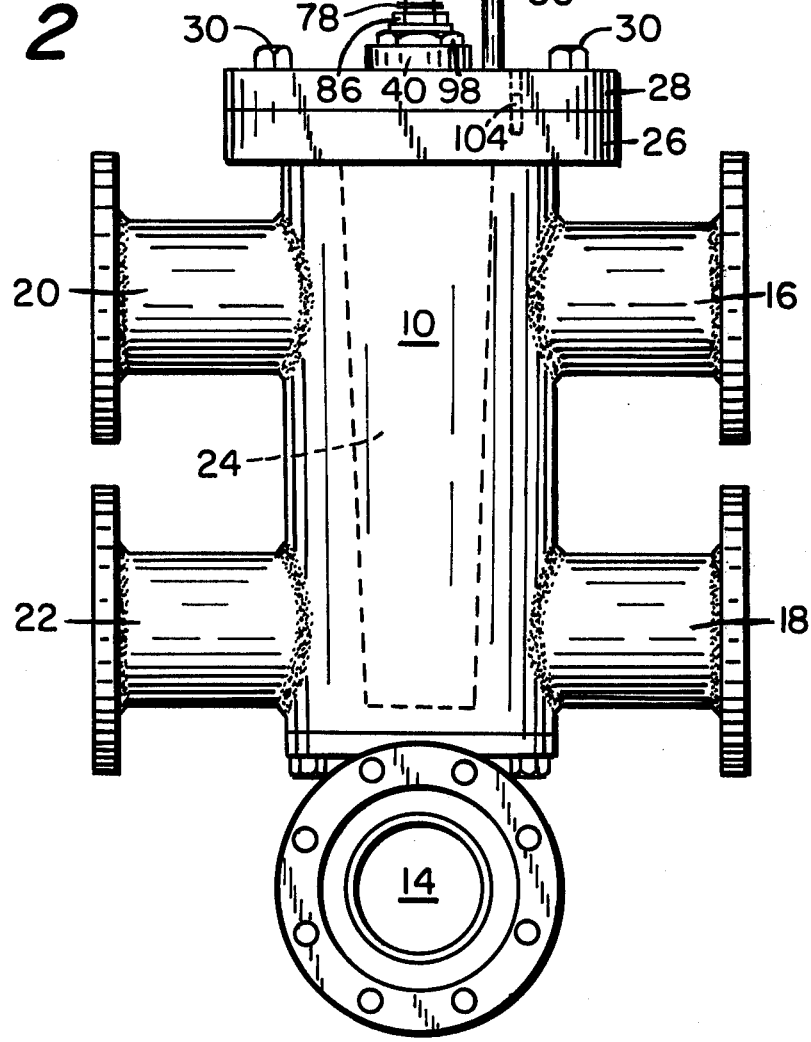
FIG. 2 is a side elevational view of the improved plug valve of the present invention.

Referring now to FIGS. 1 and 2, there is shown an improved plug valve, suitable for use as a transfer or diverter valve, including a valve body or casing 10 having an inlet port 12 extending from an elevated position on the back side of the casing 10, an outlet port 14 adjustably connected to the lower end of the casing, and two ports 18 and 16 on the right side of the casing and two ports 20 and 22 on the left side. In operation, liquid, such as oil, will flow into the valve casing through the inlet port 12 and thereafter, depending on the position of a valve plug 24 (shown in dashed outline in FIG. 2) within the housing, the liquid will flow through the plug and out of either the upper right port 16 or the upper left port 20. In a typical application for a diverter valve, the upper side ports 16 and 20 are connected to the inlet ports of separate duplex filtration units. After being filtered, the liquid will flow from the filtration unit into either of the lower side ports 18 or 22, respectively, located on the same side of the valve from which the liquid has exited. Finally, the liquid will flow through the plug and exit from the outlet port 14 at the bottom of the housing. Of course, the outlet and inlet ports may be reversed, with consequent changes in the paths of flow of liquid through the side ports.

The valve housing 10 is provided with a tapered frustoconical bore extending from the upper to the lower end thereof. The plug 24 is rotatable within the bore and has a complementary outer sealing surface which tapers inwardly in a direction extending toward the lower end of the housing and is forced into the bore to form a generally fluid-tight seal therewith. The configurations of the housing bore, the ports communicating therewith and the plug 24 may be those conventionally used in plug valves, particularly those used in standard transfer or diverter valves. It will be appreciated by one skilled in the art that the plug 24 has a port construction which is selectively registrable with the casing ports to cause the liquid to flow from the inlet port to either of the upper side ports 16 or 20 and from either of the lower side ports 18 or 22 to and out of the outlet port 14.

As shown in FIG. 2, a flange 26 is formed at the top end of the casing 10, with the flange being fabricated and welded to a casing central body. The inlet port 12 and the side ports 16, 18, 20 and 22 may also be separately fabricated and welded to the central body of the casing. The outlet port 14, on the other hand, is preferably in the form of an elbow which is secured to the lower end of central body of the casing by means of several bolts. The outlet port 14 may thus be positioned as shown in the drawings, or may be rotated 180°, whereby the inlet and outlet ports 12 and 14 may be facing the same direction.

Figure 3:
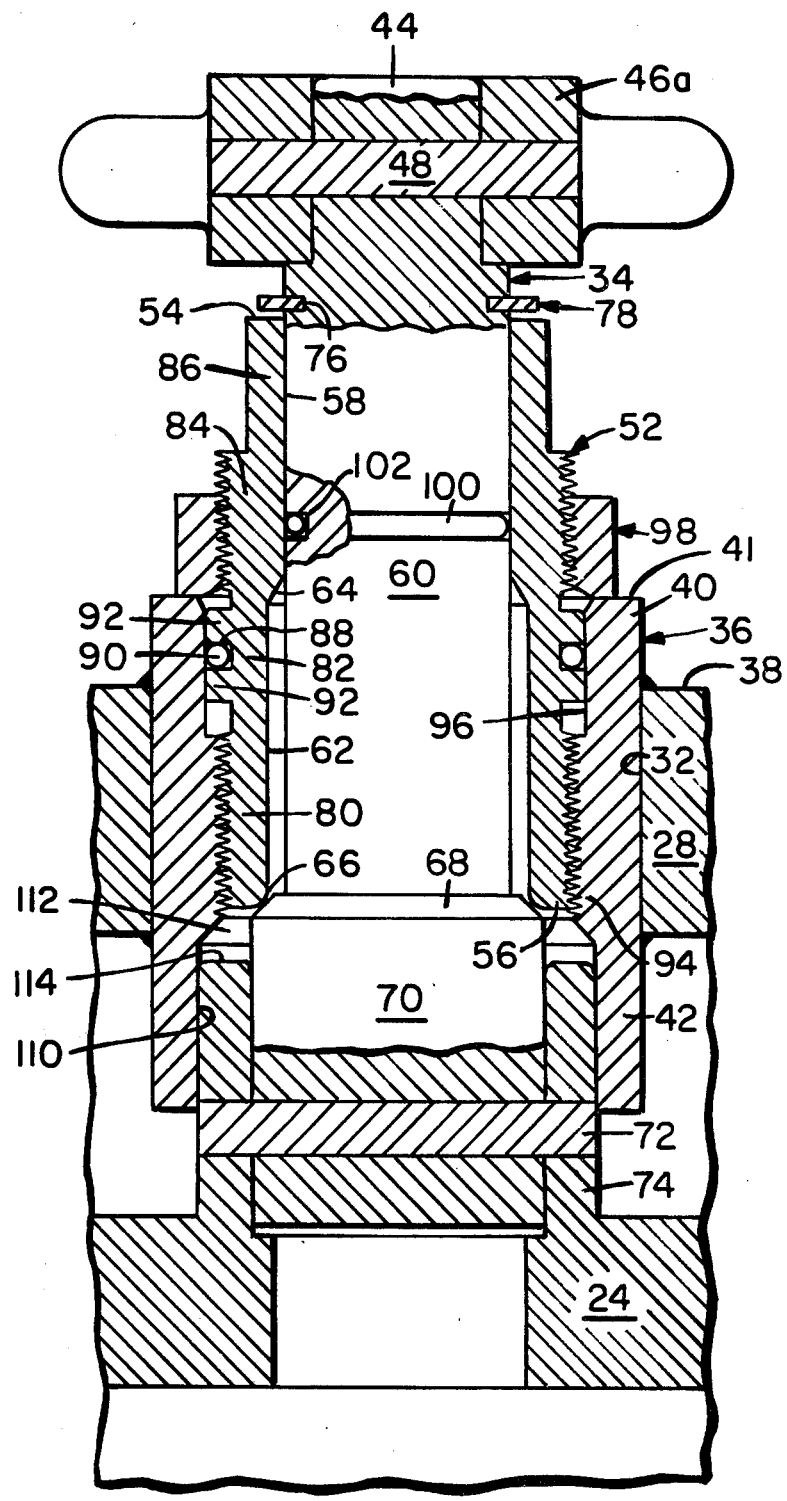
FIG. 3 is an enlarged fragmental cross-sectional view taken on line 3—3 of FIG. 1.
Figure 4:
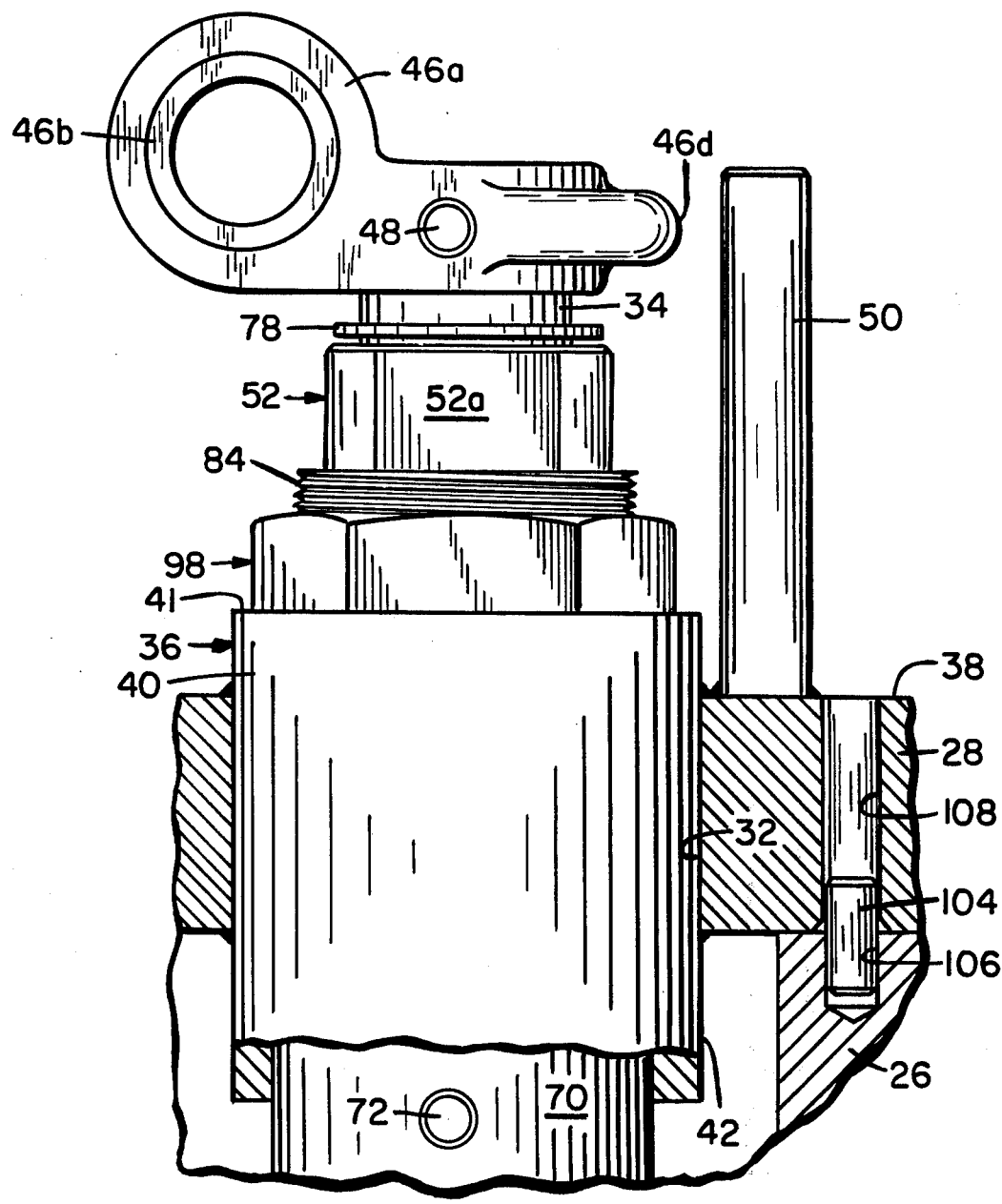
FIG. 4 is an enlarged fragmental side elevational view of the valve depicted in FIG. 2, with the cover plate and sleeve being broken away to more clearly show asymmetrically located pin means for guiding the assembly of the valve parts.

As shown in FIG. 1, the flange 26 may be of a square shape with rounded corners, although other shapes are, of course, possible. A top or cover plate 28 of the same shape as the flange is removably secured to the housing by suitable fasteners, such as bolts 30, which are shown to be located at the corners of the cover 28. An opening 32 is formed in the center of the cover 28 and permits a valve stem 34 to extend therethrough, such valve stem being preferably removably affixed at its lower end to the valve plug 24. As best seen in FIGS. 3 and 4, a hollow cylindrical or tubular sleeve member 36 is welded within the opening 32. The sleeve member 36 projects upwardly or outwardly above an upper surface 38 of the cover to form an outer or upper cover boss 40 and has a flat upper end 41 and preferably projects below the lower surface of the cover to form a lower or inner boss 42.

The stem 34 has an upper end 44; and a handle 46 is secured to the upper end 44 of the stem preferably by a suitable fastener, such as a connecting pin 48. The handle 46 may be of the customary type used with transfer valves; and, as is well known, it may have generally triangular extensions 46c and 46d on either side of its inner end which coact with a stop pin 50 secured in the cover 28. That is to say, the handle is provided with stop means for limiting its rotation and thus the rotation of the stem and the plug connected thereto. The handle and stop pin preferably coact to permit the handle to be rotated approximately 90° from two positions where extensions 46c and 46d abut the stop pin 50.

The handle 46 is preferably, however, made from two parts, a first stem operating portion 46a connected to the stem 34 having the stop means extensions 46c and 46d formed integrally therewith and a second rod portion 46d removably attached to the first portion 46a. The first portion 46a has a bore extending through it which receives an end of the rod portion 46b, and a suitable fastener such as a connecting pin or bolt is employed to secure the rod portion in the first portion 46a. The rod portion 46b may thus be secured in the front or back side of the first portion, thereby allowing the valve to be operated from either the front or back of the valve. Alternatively, the rod portion 46b may be slidably engaged in the stem operating portion 46a, with two pins being affixed near the ends of the rod portion 46b. This alternate construction permits operation from the back or front side of the valve casing without any disassembly of the handle.

As can best be seen from FIGS. 3 and 4, the main working element of the valve operating means is a gland member 52 which is turned upwardly to jack the valve plug 24 upwardly from the valve bore so that the plug may be turned and thereafter downwardly to force the plug back into a fluid-tight fit within the valve bore. The gland member 52 is generally of a hollow, cylindrical or tubular shape terminating at upper and lower ends 54 and 56, respectively. The inner surface of the gland 52 has an upper portion 58 having a diameter only slightly greater than a intermediate portion 60 of the stem 34 situated therein. A lower portion 62 of the inner surface of the gland 52 has a diameter which is greater than the diameter of the upper portion 58; and the upper and lower portions 58 and 62 are connected by a beveled portion 64, such beveled portion serving to guide a resilient annular seal into place, as will be described below.

The upper end 54 of the gland is preferably flat, while the lower end 56 thereof is provided with a rounded inner surface portion 66 adapted to form a low friction line contact with an outwardly beveled or tapered portion 68 of the stem. The lower end portion 70 of the stem is thus of an enlarged diameter relative to the intermediate portion 60 thereof, with such end portion 70 serving as a stop means which coacts with the lower end 56 of the gland to force the stem and, hence, the plug downwardly.

Preferably, the stem 34 is connected to the valve plug 24 by means of a removable pin 72. More specifically, the plug 24 may have a short hollow cylindrical boss 74 extending axially and upwardly from the upper end of the plug. The bore of boss 74 is preferably cylindrical and is of a diameter adapted to receive the lower end portion 70 of the stem; and the plug boss 74 and the lower end of the stem are connected by the plug pin 72. Manifestly, it is also possible to form the stem 34 integrally with plug 24, and thus the particular construction features relating to the connection of the stem and plug should not be construed as limiting the invention.

At the upper end of the intermediate stem portion 60, at a selected distance below the handle 46, an annular groove 76 is formed to receive an annular snap ring 78. The snap ring 78 may have a partially circular shape, such as a Tru-Arc brand snap ring obtainable from the Waldes Company. As will be discussed below, the snap ring 78 functions as an upper or second stop means for coacting with the flat upper end 54 of gland 52 to jack the valve plug 24 from the valve bore when the gland is turned upwardly. To minimize the turning distance tranversed by the gland 52 between its lowermost position against the beveled portion 70 of the stem and its jacking position against the snap ring 78, the amount of stem showing between the ring 78 and the gland 52 when the gland is fully turned down should be minimized. However, it will be appreciated that enough distance might separate the two elements to facilitate convenient insertion and removal of the ring during the assembly and disassembly procedures.

The gland has an outer surface including a threaded lower portion 80, an intermediate sealing portion 82 disposed above the threaded lower portion 80, a second or upper threaded portion 84 extending above the sealing portion 82, and a top portion 86 having a partially squared or blocked configuration or other shape having flat portions 52a to be received by means for turning the gland, such as a wrench. The sealing portion 82 has at least one annular groove 88, preferably of a rectilinear cross section, for receiving an elastomeric or resilient packing ring 90, such as an O-ring made from a synthetic resinous material, for example, a polytetrafluoroethylene sealing material sold by the Parker Seal Company under the trade name, Viton. As shown in FIG. 3, the annular groove 88 may be formed between two annular beads or ridges 92, both having equal outer diameters which are somewhat greater than the maximum outer diameter of the threaded lower section 80 of the gland.

The gland 52 is threadably engaged by and rotatable within the sleeve member 36. The inner surface of sleeve member includes a threaded bore portion 94 for receiving the lower threaded portion 80 of the gland 52, and a smooth cylindrical sealing portion 86 projecting above the threaded bore 94 and having a diameter greater than the maximum diameter of the threaded bore portion 94. The inner diameter of the sealing portion 96 is adapted to form a liquid-tight seal with the resilient sealing ring 90 contained within the annular groove 88 on sealing portion 82 of the gland 52. At the upper end of the sealing portion 96, a beveled edge may be formed to facilitate the insertion of the gland with the sealing ring engaged thereon.

The inner surface of the lower extent of the sleeve, corresponding to the lower boss 42 mentioned above, preferably includes a beveled portion 112 which tapers radially outwardly and downwardly from the threaded portion 94 to a cylindrical guiding portion 110 having diameter which is only slightly larger than the outer diameter of the cylindrical outer surface of the plug boss 74. The portion 110 is sufficiently long to guide the upward movement of the plug boss 74 during assembly of the valve and also during jacking and lowering of the valve plug. As will be discussed below, the beveled portion 112 of the sleeve inner surface is located a predetermined vertical distance from the upper extremity of the cylindrical sealing surface 96 of the sleeve and such distance is selected so that when the upper surface or edge 114 of the plug boss abuts the beveled portion 112, the sealing ring 90 will still be fluid-tightly engaged between the gland outer surface and the sealing portion 96 of the sleeve inner surface.

The gland 52 is selectively locked or restrained from moving within the sleeve 36 by a locknut member 98 which is rotatably engaged to the upper threaded portion 84 of the gland. The gland may thus temporarily be secured in place by tightening the locknut 98 against the upper end of the sleeve 52, that is against the upper cover boss 40. When the gland is fully lowered within the valve bore and the locknut 98 is tightened down, the plug 24 will be restrained from moving out of the bore under the influence of fluid pressure.

A fluid-tight seal between the stem and the gland is formed by means of a second elastomeric or resilient sealing ring 100, such as an O-ring of the same type as mentioned above in connection with the sealing ring 90, which is partially contained in an annular groove 102 formed in the intermediate portion 60 of the stem. The sealing ring 100 and groove 102 are disposed at a height on the stem which registers with the upper reduced diameter portion 58 of the gland. It will be appreciated that the tapered or beveled portion 64 formed immediately below the upper portion 58 of the gland inner surface, together with the guiding action of the sleeve inner surface portion 110, facilitate the insertion of the stem and sealing ring assembly into the upper portion 58.

In order to more fully elucidate the various features and advantages of the present valve operating means and its sealing means, the operation of the valve as described above will now be set forth. The valve plug 24 is jacked from within its complementary valve bore by the following procedure: first, the locknut 98 is turned upwardly, by a wrench applied thereto, to raise the locknut from its position adjacent the cover boss 40; next, a wrench or other tool is applied to the upper contoured portion 86 of the gland 52 and is rotated to turn the gland upwardly until it bears against the upper stop means formed by the snap ring 78; thereafter, the gland is rotated further upwardly against the snap-ring a sufficient amount to raise the plug 24 from the valve bore to thereby permit free rotational movement of the plug; and, after such jacking is complete, the handle 46 is turned until one of its extensions 46c or 46d, which is initially rotationally displaced from the stop pin 50, abuts the stop pin 50, thus transferring the flow of liquid through the valve from one set of side ports to the other set without interrupting the flow of liquid through the inlet and exit ports thereof.

While the plug 24 is in a jacked or elevated position, the liquid flowing therethrough may be under very high pressure, for example, up to 1400 psi; and due to the raised position, the liquid will be urged to flow upwardly over the upper end of sealing surfaces of the plug, over the plug boss 74 and into the sleeve member 36. It is thus essential, at such high pressure conditions, that the valve operating means be adequately sealed to prevent leakage when the valve plug is in an elevated or jacked position. The seal between the stem intermediate portion 60 and the gland upper inner surface portion 58 is provided by the 0-ring 90; and the liquid-tight seal between the gland and the sleeve sealing portion 96 is formed by the 0-ring 100 whereby leakage from the valve during the jacking and lowering of the plug is prevented.

As briefly described above, the beveled inner surface portion 112 of the sleeve 36 coacts with the upper end 114 of the plug boss 74 to prevent the gland 52 from being jacked to an elevation such that the annular sealing ring 90 becomes disengaged from the cylindrical sealing surface 96 of the sleeve. Under usual circumstances, a trained operator would turn the gland only enough to raise the plug enough that the plug can be turned. However, if the gland was turned beyond such an elevation, the sealing ring 90 would of course approach the upper beveled edge of the sealing portion 96; but when the plug upper end 114 abuts the beveled portion 112 of the sleeve, the upward motion of the plug and gland will be arrested, thus preventing the O-ring 90 from disengaging. In this manner, fail-safe sealing during the jacking operation is provided.

The procedure for lowering the valve plug back into the valve bore and tightly engaging the two parts is the reverse of the jacking procedure. With the handle being held against the stop in, the gland is rotated downwardly until its lower rounded inner surface portion 66 bears tightly against the beveled section 68 of the stem. Then, the locknut 98 is tightened against the upper cover boss 40. It will be appreciated that the locknut provides tamper-resistant operation of the valve and prevents the gland 52 from rotating upwardly under the influence of vibrations caused by varying fluid pressures exerted on the plug 24.

Another important aspect of the present invention relates to a plug valve construction which prevents, during assembly of the various valve parts, an improper orientation of the valve plug 24 within the valve bore. As can be seen from FIG. 4, the pins 48 and 72 connecting the handle 46 and the plug 24, respectively, to the stem 34 are positioned asymmetrically or off-center with respect to the axis of the stem. That is, the pins 48 and 72 are received in bores formed in the stem and the handle portion 46a and plug boss 74, respectively; and each of such bores has an axis which does not intersect but rather is spaced apart from the axis of the respective part into which it is formed, that is, from the axis of the stem 34, the axis of the complementary bore of handle portion 46a and the axis of the cylindrical outer surface of the plug boss 74. More specifically, such pin-receiving bores preferably have axes lying in planes normal to the axis of the stem, the bore of handle portion 46a and the outer surface of boss 74, but are offset from the axes of such parts, i.e., the axis of rotation of the handle stem and plug.

As further shown in FIGS. 1, 2 and 4, the cover plate 28 and casing flange 26 may be provided with vertical bores 108 and 106, respectively, which register with each other; and a guide pin or lug 104, which may be interference fitted or welded in the casing bore 106, is employed to prevent the cover from being secured to the casing except for in the rotational position wherein the pin 104 is received within the cover bore 108. In this manner, the pin 104 serves as a first means for guiding the assembly of the cover plate and casing; and the asymmetrically located pins 48 and 72 serve as a second means for guiding the assembly of the handle 46, stem 34, and plug 24. A third guide means for assembling the handle 46 and the cover plate is provided by the cooperation of the stop pin 50 welded to the cover plate 28 and the stop extensions 46c and 46d formed in the first handle portion 46a. These three guide means together assure that the valve parts will be assembled in the proper or correct manner, such that when the parts are assembled, the plug and casing ports will properly register to provide the desired flow paths through the casing ports when the handle is positioned such that either stop extension 46c or 46d abuts the stop pin 50.

It will be appreciated by those skilled in the art that stop extensions or means of different forms may be provided on the handle and yet obtain the same results. Also, in lieu of using a lug or pin 104, the bolts 40 securing the cover 28 to the casing 10 may be asymmetrically located to assure that the cover may be fastened to the casing flange in only one position.

Although the present invention has been described with respect to specific details of a certain embodiment thereof, it is not intended that such details be limitations upon the scope of the invention except insofar as set forth in the following claims.

What is claimed is:

1. in combination with a plug valve of the type including a valve casing having several ports communicating with a valve bore and a cover plate at one end of said valve casing having an opening therethrough, plug means within said valve bore for controlling flow through said ports, an operating stem connected coaxially to an upper end of said plug means and extending through said cover opening, handle means connected to an outer end of said stem for turning said plug to at least two rotational positions in said bore, and means associated with said handle means and said cover for stopping the rotation of said handle at said two rotational positions, the improvement which comprises means for lifting and lowering said plug from and into said bore including:

a sleeve member within said cover plate opening having a threaded inner surface portion and a smooth cylindrical inner surface portion and an upper end projecting above said cover plate;

said stem having a first annular stop means at an upper end portion thereof and a second annular stop means at a lower end portion thereof;

gland means rotatable within said sleeve threaded portion for selectively bearing upwardly against said first stop means to lift said plug means from said bore and thereafter downwardly against said second stop means to force said plug means into said bore;

means at the upper end of the gland for turning said gland;

locknut means rotatable on said gland and against said sleeve upper end for selectively engaging said gland to maintain said gland in said lowered position;

first annular sealing means between said gland and said cylindrical inner surface portion of said sleeve; and, second annular sealing means between said gland and said stem.

2. The plug valve of claim 1 wherein, said plug means includes a hollow cylindrical plug boss extending coaxially from said upper end of said plug and terminating in an upper end;

said sleeve member includes a beveled portion tapering outwardly from said threaded portion in the direction of said plug boss and a cylindrical surface portion extending from said beveled portion, with said cylindrical portion serving as means for guiding the upward and downward movement of said plug boss and hence said plug means and said stem; and said beveled surface coacting with said boss upper end to stop the upward movement of said gland to maintain said first sealing means in said position between said cylindrical inner surface of the sleeve and said gland.

3. The plug valve of claim 1 wherein, said handle means and said plug means are respectively connected to said stem by pin means, each of said pin means being asymmetrically received in said stem such that the axis of each pin means intersects said stem offset from the axis of said stem, whereby said handle means and said plug means can only be connected to said stem in a selected relationship to each other;

said cover plate and said casing include means for guiding their assembly in only one selected orientation therebetween; and said means for stopping the rotation of said handle means includes a stop pin projecting from said cover plate and stop extensions incorporated into said handle means which coact with said stop pin to stop the rotation of said handle means at said two rotational positions;

whereby said plug means, stem, handle means, cover plate and casing may be assembled such that said plug means is in a selected orientation relative to said casing ports.

4. A plug valve for directing the flow of fluid through one of at least two piping circuits comprising:

a casing having a bore and several ports in fluid communication with said bore, said casing having a cover plate secured thereto above an upper end of said bore, said plate having an opening therein coaxial with said bore;

a plug rotatable within said bore for controlling the flow of liquid through said casing ports, said plug having a boss extending axially from the upper end thereof;

a stem having a lower end secured to said plug boss and an upper end attached to handle means for turning said plug, said stem including a first annular stop means positioned proximal said handle means, and a second annular stop means proximal said plug boss;

a sleeve member affixed within said plate opening having an inner surface embodying a threaded portion and a cylindrical sealing portion;

a gland member rotatable in said sleeve member and about said stem, said gland having a lower end for bearing against said second stop means to force said plug into said bore and an upper end for bearing against said first stop means to lift said plug from said bore; said gland having an outer surface including a first threaded portion received within said sleeve threaded portion, a sealing portion provided with resilient ring means for engaging said sleeve sealing portion in a movable fluid-tight seal therewith, a threaded portion registering with an upper end of said sleeve, and an upper end portion shaped to receive means for turning said gland; said gland and said stem having another resilient ring means therebetween for forming a fluid-tight seal therewith; and, nut means rotatably engaged on said second threaded portion of the gland outer surface and against said sleeve upper end for selectively stopping the rotation of said gland within said sleeve when said gland is bearing against said plug.

5. The plug valve of claim 4 wherein said plug boss is of a hollow cylindrical form extending coaxially from said upper end of said plug and terminating in an upper end;

said sleeve member includes a beveled portion tapering outwardly from said threaded portion in the direction of said plug boss and a cylindrical surface portion extending from said beveled portion, with said cylindrical portion serving as means for guiding the upward and downward movement of said plug boss and hence said plug and said stem; and said beveled surface coacting with said boss upper end to stop the upward movement of said gland to maintain said first sealing means in said position between said cylindrical inner surface of the sleeve and said gland.

6. The plug valve of claim 4 wherein, said handle means and said plug are respectively connected to said stem by pin means, each of said pin means being asymmetrically received in said stem such that the axis of each pin means intersects said stem offset from the axis of said stem, whereby said handle means and said plug can only be connected to said stem in a selected relationship to each other.

said cover plate and said casing include means for guiding their assembly in only one selected orientation therebetween; and said means for stopping the rotation of said handle means includes a stop pin projecting from said cover plate and stop extensions incorporated into said handle means which coact with said stop pin to stop rotation of said handle means at said two rotational positions;

whereby said plug, stem, handle means, cover plate and casing may be assembled such that said plug means is in a selected orientation relative to said casing ports.

7. In combination with a plug valve including a valve casing having several ports communicating with a valve bore and a cover at one end of said casing having an opening therethrough, plug means within said valve bore for controlling flow through said ports, an operating stem connecting coaxially to an end of said plug means and extending through said cover opening, handle means connected to said stem for turning said plug means to at least two selected rotational positions in said bore, and means for stopping the rotation of said handle means at said selected positions; means for lifting and lowering said plug means comprising: said stem having axially spaced-apart annular upper and lower stop means; tubular means, adjustably threadably rotatable within said cover opening and freely rotatable about said stem between said spaced-apart stop means of said stem, for selectively bearing upwardly against said upper stop means to lift said plug means from said bore and for thereafter bearing downwardly against said lower stop means to lower said plug means into said bore; said tubular means having means on an upper end thereof for turning said tubular means within said opening; said tubular means being selectively restrained within said cover opening by locknut means applied to said tubular means below said turning means; said stem and tubular means being sealed against leakage by a first sealing ring interposed therebetween; and said tubular means and said cover opening being sealed against leakage by a second sealing ring, wherein said plug means includes a hollow cylindrical plug boss extending coaxially from said upper end of said plug, with said plug boss terminating in an upper end;

said cover opening includes means embodying a beveled portion tapering outwardly and downwardly in the direction of said plug boss and a cylindrical portion having a diameter slightly larger than the diameter of said plug boss to thereby guide the upward and downward movement of said plug boss and hence said stem and said plug means; and said beveled surface portion coacting with said boss upper end to stop the upward movement of said tubular means to maintain said second sealing ring in a sealing position between said tubular means and said cover opening.

8. The combination of claim 7 wherein said means embodying said beveled and cylindrical portions is a tubular sleeve-like member secured with said cover opening, and said sleeve-like member includes a threaded portion extending above said beveled portion adapted to receive a complementary threaded portion formed on said tubular means.

* * * * *